United States Patent

Wilson et al.

[11] Patent Number: 5,599,757
[45] Date of Patent: Feb. 4, 1997

[54] NPO DIELECTRIC CERAMIC COMPOSITIONS AND CAPACITORS MADE THEREFROM

[75] Inventors: James M. Wilson, Victor; Walter J. Symes, Jr., Dundee, both of N.Y.

[73] Assignee: Ferro Corporation, Cleveland, Ohio

[21] Appl. No.: 548,710

[22] Filed: Oct. 26, 1995

[51] Int. Cl.$^6$ ............................. C04B 35/468; H01G 4/10
[52] U.S. Cl. ..................... 501/137; 501/138; 361/321.4; 361/321.5
[58] Field of Search ................................... 501/137, 138; 361/321.4, 321.5

[56] References Cited

U.S. PATENT DOCUMENTS

| | | | |
|---|---|---|---|
| 3,775,142 | 11/1973 | Roup | 252/520 |
| 4,379,319 | 4/1983 | Wilson | 361/321 |
| 4,394,456 | 7/1983 | Sakabe et al. | 501/138 |
| 4,500,942 | 2/1985 | Wilson | 361/320 |
| 4,528,613 | 7/1985 | Stetson et al. | 501/137 |
| 5,065,275 | 11/1991 | Fujisaki et a. | 361/321 |
| 5,262,370 | 11/1993 | Negas et al. | 501/138 |
| 5,335,139 | 8/1994 | Nomura et al. | 501/137 |

*Primary Examiner*—Karl Group
*Attorney, Agent, or Firm*—Shlesinger Fitzsimmons Shlesinger

[57] ABSTRACT

A low temperature fired NPO type ceramic dielectric composition is employed for making high frequency multi-layer capacitors having dielectric constants between 25 and 40 at room temperature, and which do not vary from this base line value by more than ±30 parts per million (PPM)/°C. over a temperature range of −55° C. to +125° C. with the value at +25° C. being the reference point. The dielectric composition is made from a base dielectric ceramic formulation and a low melting point glass formulation, each derived from metal oxides or precursors thereof. Manganese dioxide or a precursor thereof may be added in the amount of from about 0.012 to 0.060 weight percent as the dioxide based on the combined weight of the ceramic formulation and the glass formulation. The mixtures, when made into multi-layer ceramic capacitors (MLCC), are fired at or below 1120° C.

10 Claims, No Drawings

NPO DIELECTRIC CERAMIC COMPOSITIONS AND CAPACITORS MADE THEREFROM

BACKGROUND OF THE INVENTION

This invention relates to improved NPO dielectric ceramic compositions for manufacturing multi-layer capacitors that are particularly suitable for use in high frequency applications. More particularly, this invention relates to improved NPO low firing, temperature stable dielectric ceramic compositions which are capable of achieving very high Q values when employed in high frequency capacitor applications.

There are currently available in the marketplace many ceramic dielectric compositions which meet EIA (Electronic Industries Association) specifications for NPO temperature coefficient of capacitance (T.C.C.)—i.e., maximum allowable change in capacitance over a temperature range of $-55°$ C. to $+125°$ C. is $\pm30$ p.p.m./°C. These compositions may exhibit dielectric constants (K') in low (15–20), mid (60–70) or high (90–110) ranges. Some of these compositions constitute relatively high temperature (1250°–1300° C.) sintering formulations, such as for example as disclosed in U.S. Pat. No. 3,775,142, while others such as for example as disclosed in U.S. Pat. Nos. 4,394,456 and 4,500,942, the latter of which is assigned to the same assignee as the present application, constitute formulations disposed to be sintered at low temperatures in the range of 1120° C. or less. As a general statement, high firing NPO formulations produce denser fired ceramic compositions when fabricated into multi-layer ceramic capacitors (MLCC's), such as for example the type illustrated in FIG. 2 of U.S. Pat. No. 4,379,319, which also is assigned to the same assignee as the present application, and the contents of which patent are hereby incorporated herein by reference.

Among the disadvantages of the above-noted prior art NPO formulations is that they generally require a larger energy input in order to sinter the ceramic; and this in turn necessitates the use of expensive internal electrode materials, such as palladium, platinum and gold, either separately or in combinations thereof. It is also well known to those skilled in the art that ceramic dielectric compositions having low dielectric constants (approximately 20) and high Q values (greater than 10,000) are primarily derived from $MgTiO_3$ based formulations. These formulations are notoriously difficult to work with, especially in water based systems. This is due to the fact that free $Mg++$ ions present in these mixtures readily hydrate to form $Mg(OH)_2$, which in turn creates rheological problems when the material is made into the slip for tape casting during preparation of MLCC's. Because of the presence of the free $Mg++$ ions, there is often a need for increasing the amount of dispersant and/or the amount of the aqueous solvent ($H_2O$). This in turn often creates a green ceramic that possesses a lower green density than is desired. This lower green density translates into a lower fired density in the resultant multi-layer capacitor, which can have the effect of creating increased porosity and consequent degradation of the capacitor's electrical properties.

These same rheological problems are encountered when rare earth titanates, such as neodymium titanates, are employed as suggested by the above-noted U.S. Pat. No. 4,394,456. In such case the $Nd+++$ ions function in a manner similar to magnesium ions, and cause a fall off of the Q and Tf of a capacitor made therefrom, when the capacitor is operated at microwave frequencies.

Although MLCC's prepared from low firing NPO formulations can be sintered at or below 1120° C., and therefore can employ lower cost internal electrode materials, nevertheless the low melting point glass components, which are added to the base ceramic formulation to enable the lower sintering temperatures, can induce porosity in the fired capacitor as the glass melts and diffuses through the base ceramic formulation. As in the case of the above-noted problem generated when free $Mg++$ ions are present in the formulation, any porosity resulting from the glass diffusion can lead to lower density of the fired ceramic, which in turn can lead to degradation of the electrical properties, such as reliability, insulation resistance (IR) and high frequency dissipation factor (df). Moreover, such degradation can also occur if the glass is not formulated correctly, since the glass components can react with certain of the components in the base ceramic formulation, thereby resulting in undesirable high loss phases which lead to a decrease in the overall Q of the sintered product.

There currently is a need for low fired ceramic dielectric compositions having moderate dielectric constants, excellent high frequency dissipation factor (df), and excellent temperature stability, in order to meet the increasing demand for MLCC's that are capable of maintaining enhanced properties in the 1 MHz to microwave frequency range. Historically operating frequencies of 1 KHz to 1 MHz were typical for MLCC's, but improvements in technology, especially in telecommunications, have led to new applications which extend into the microwave region. This is evidenced by the enormous growth in wireless communication devices, such as wireless telephones, personal paging systems, satellite navigation systems, etc. It is these systems which have created a demand for MLCC's and other passive components capable of operating in higher frequency ranges, for instance upwardly of 5 GHz.

Accordingly, it is the object of this invention to produce low fire, $BaTiO_3$ based temperature stable dielectric compositions which are particularly suitable for producing MLCC's having dense fired micro-structures, and which are capable of being utilized in higher frequency applications.

Another object of this invention is to produce a low fire NPO dielectric composition having a low dielectric constant in a range of between 25 and 40, and which will allow for very tight control of the capacitance values within a temperature range of $-55°$ to 125° C. of MLCC's made from such a composition.

A still further object of this invention is to produce a low fire NPO composition for producing a MLCC which will generate a dissipation factor of $\leq 0.010\%$ at a test frequency of 1 MHz with an applied signal of 1.0 Vrms, and a Q in excess of 5000 at a test frequency of 5 GHz.

A further object of this invention is to produce from a low fire NPO composition MLCC's which will generate resistance values of $>10\times10^{12}$ ohms at 25° C. and insulation resistance values (IR) of $>100$ MegΩ·μfd at 125° C.

It is the object also of this invention to produce a low fire ceramic composition that obviates problems heretofore encountered when employing formulations containing $MgTiO_3$ or rare earth oxides in the manufacture of MLCC's.

Other objects of this invention will be apparent hereinafter from the specification and from the recital of the appended claims.

SUMMARY OF THE INVENTION

A substituted $BaTi_4O_9$ is formulated from $BaTiO_3$ and the oxides of titanium, zirconium, and silica, and when calcined and mixed with a low melting temperature glass sintering aid, form NPO compositions for producing MLCCs having a T.C.C. of ±30 PPM/°C. and a dielectric constant between 25 and 40 as well as a dissipation factor of ≦0.010% at 1 MHz test frequency, resistance values of >10×10$^{12}$ ohms at 25° C., and insulation resistance (IR) of >100 MegΩ·µfd at 125° C. The compositions can be utilized in a wide variety of MLCC production processes.

PREFERRED EMBODIMENTS OF THE INVENTION

The novel ceramic compositions disclosed herein include base ceramic dielectric formulations, ten samples of which are listed in the following Table 1, that are formulated from mixtures of $BaTiO_3$, $TiO_2$, $ZrO_2$ and $SiO_2$. These formulations are calcined and then mixed with a finely powdered low melting point glass frit formulation noted hereinafter.

TABLE 1

| Sample | Composition by weight % | | | |
|---|---|---|---|---|
| | $BaTiO_3$ | $TiO_2$ | $ZrO_2$ | $SiO_2$ |
| #1 | 42.13 | 44.73 | 10.54 | 2.60 |
| #2 | 37.28 | 51.09 | 9.33 | 2.30 |
| #3 | 45.40 | 40.44 | 11.36 | 2.80 |
| #4 | 47.53 | 38.27 | 11.40 | 2.80 |
| #5 | 48.31 | 43.02 | 5.69 | 2.98 |
| #6 | 46.01 | 39.72 | 11.42 | 2.84 |
| #7 | 46.67 | 38.85 | 11.59 | 2.89 |
| #8 | 46.08 | 41.05 | 11.44 | 1.42 |
| #9 | 46.75 | 41.64 | 11.61 | 0.00 |
| #10 | 44.86 | 39.96 | 11.14 | 4.04 |

For example, each of the sample formulations listed in the above Table 1 were wet milled in a porcelain jar mill containing $ZrO_2$ milling media. The resultant slurry was dried, crushed and calcined at 1050° C. for 2 hours. The calcined mixture was pulverized to a fine powder and then mixed at a ratio of 94 wt. % ceramic to 6 wt. % of the glass sintering aid having a formulation of from about 46.10 to 56.55 wt. % PbO, from about 16.26 to 19.95 wt. % $B_2O_3$, from about 7.32 to 22.27 wt. % $SiO_2$, from about 4.08 to 5.00 wt. % $TiO_2$, from about 4.76 to 5.84 wt. % LiF, from about 1.01 to 1.24 wt. % $ZrO_2$ and from about 4.12 to 5.53 wt. % $Al_2O_3$. The calcined ceramic formulation and glass frit formulation were mixed in much the same way the ceramic was mixed using a porcelain jar mill and $ZrO_2$ media.

The resultant slurry was dried, pulverized and added to an acrylic binder system at a ratio of 50 wt % formuated low fire ceramic and 50 wt. % binder solution to prepare a slip for tape casting. The resulting slip was cast into sheets, cut to size and screen printed with 70 wt. % Ag, 30 wt. % Pd internal electrode paste. These sheets were then stacked, laminated and cut into individual MLCC's as taught, for example, in the above-noted U.S. Pat. Nos. 4,379,319 and 4,500,942. The resultant MLCC's were then put through a pre-firing oven with a temperature profile of about 20 hours increasing from about room temperature to about 250° C. and then remaining at about 250° C. for about 6 hours to remove most of the organic binder constituents.

The MLCC's were then fired on $ZrO_2$ setter sleds at temperatures of 1080° C., 1100° C. & 1120° C. through a pusher slab furnace at a rate of 12 inches per hour with the MLCC's soaking at the maximum temperature for about 45 minutes of the overall firing. Said MLCC's were then terminated with an Ag conductor paste, which was fired on at 750° C. for about 20 minutes, and tested with the properties indicated in Table II.

TABLE II

Electrical properties of MLCC's

| | Sample # | | | | |
|---|---|---|---|---|---|
| | 1 | 2 | 3 | 4 | 5 |
| Sintering Temp. °C. | 1100 | 1100 | 1100 | 1100 | 1100 |
| % df @ 1 KHz | 0.62 | 4.06 | 0.010 | 0.014 | 0.011 |
| % df @ 1 MHz | 0.03 | 0.093 | 0.017 | 0.063 | 0.025 |
| IR (25° C.) | 38 | 421 | >8647 | 2003 | >10000 |
| IR (85° C.) | 0 | 6 | 609 | 301 | 640 |
| IR (125° C.) | 0 | 0 | 89 | 42 | 156 |
| T.C.C. (–55° C.) | N015 | P093 | N020 | N035 | N025 |
| T.C.C. (85° C.) | P334 | P860 | N018 | N024 | N025 |
| T.C.C. (125° C.) | P526 | P1000 | N016 | N016 | N023 |
| Diel. Constant | 34 | 43 | 29 | 35 | 37 |

| | Sample # | | | | |
|---|---|---|---|---|---|
| | 6 | 7 | 8 | 9 | 10 |
| Sintering Temp. °C. | 1100 | 1100 | 1100 | 1100 | 1100 |
| % df @ 1 KHz | 0.010 | 0.011 | 0.025 | 0.015 | 0.013 |
| % df @ 1 MHz | 0.032 | 0.058 | 0.042 | 0.055 | 0.034 |
| IR (25° C.) | >9128 | 1489 | 1173 | 975 | >9490 |
| IR (85° C.) | 520 | 267 | 126 | 76 | 1064 |
| IR (125° C.) | 81 | 37 | 15 | 9 | 214 |
| T.C.C. (–55° C.) | N021 | N029 | N030 | N079 | N017 |
| T.C.C. (85° C.) | N018 | N023 | N001 | N049 | N022 |
| T.C.C. (125° C.) | N017 | N014 | N023 | N035 | N018 |
| Diel. Constant | 33 | 35 | 38 | 35 | 32 |

Referring to the results of the samples listed in Table II, it can be noted that sample compositions #3, #5, #6, #7, #8 and #10 meet the E.I.A. specification for NPO type dielectrics; and it should be further noted that composition #3 exhibits both the dielectric constant closest to 30 as well as the lowest 1 MHZ and 1 KHz dissipation factors.

Another factor to be observed from these tables is that increasing the ratio of $BaTiO_3$ to $TiO_2$ generates a lower dielectric constant, while decreasing the ratio of $BaTiO_3$ to $TiO_2$ (i.e. a ratio of 0.73 in composition #2) causes the dielectric constant to be increased.

Another factor to be noted is that increasing levels of $TiO_2$ also generates a very positive shift in T.C.C. (samples #1 & #2), while decreasing levels of $TiO_2$ (sample #4) or eliminating $SiO_2$ (sample #9) lead to negative shifts in T.C.C.

From the foregoing it is apparent that composition #3 is closest to achieving the most desirable electrical characteristics for the purpose intended, thus indicating that alterations to the glass portion of this composition could produce the final desired capabilities.

Another factor is that of the insulation resistance. It is well known by those skilled in the art that small additions of MnO, either as the oxide or some precursor thereof, can sometimes provide rather dramatic improvement of the IR values in dielectric ceramic compositions, especially at elevated temperatures. This was also evaluated by modifying sample #3 (hereinafter host #3) by adding slight amounts of a 50% aqueous solution of Mn $(NO_3)_2$ and/or $SiO_2$. Table III lists these further iterations of the fluxing of host composition #3 as samples 3A–3G.

TABLE III

| | Compositions by wt. % | | | | | | |
|---|---|---|---|---|---|---|---|
| | Sample # | | | | | | |
| | 3A | 3B | 3C | 3D | 3E | 3F | 3G |
| Host #3 | 94.0 | 94.0 | 94.0 | 92.5 | 92.5 | 91.0 | 92.5 |
| Glass | 6.0 | 6.0 | 6.0 | 7.5 | 7.5 | 7.5 | 6.0 |
| $SiO_2$ | — | — | — | — | — | 1.5 | 1.5 |
| $Mn(NO_3)_2$ | 0.10 | 0.15 | 0.25 | — | 0.25 | 0.05 | 0.05 |

The electrical characteristics of the above-listed compositions are presented below in Table IV.

TABLE IV

| | Electrical properties of MLCC's | | | | | | |
|---|---|---|---|---|---|---|---|
| | Sample # | | | | | | |
| | 3A | 3B | 3C | 3D | 3E | 3F | 3G |
| Sintering Temp. °C. | 1100 | 1100 | 1100 | 1100 | 1100 | 1100 | 1100 |
| % df @ 1 KHz | 0.011 | 0.013 | 0.016 | 0.012 | 0.019 | 0.012 | 0.009 |
| % df @ 1 MHz | 0.004 | 0.018 | 0.016 | 0.013 | 0.020 | 0.010 | 0.008 |
| IR (25° C.) | >7250 | >8170 | 5110 | >7431 | 3518 | >5271 | >4839 |
| IR (85° C.) | 1230 | 1474 | 574 | 1292 | 358 | 949 | 996 |
| IR (125° C.) | 178 | 181 | 106 | 199 | 63 | 171 | 149 |
| T.C.C. (−55° C.) | N013 | N025 | N018 | N019 | N020 | N020 | N020 |
| T.C.C. (85° C.) | N030 | N024 | N026 | N018 | N020 | N017 | N019 |
| T.C.C. (125° C.) | N023 | N021 | N021 | N015 | N016 | N014 | N017 |
| Diel. Constant | 34 | 33 | 31 | 34 | 33 | 31 | 29 |

Comparing the formulas in Table III with the resultant electrical characteristics in Table IV it can be seen that the addition of small amounts of $Mn(NO_3)_2$ tends to improve the 125° C. insulation resistance, while levels of at least 0.25 wt. % have a deleterious effect (#3C & #3E). It can also be seen that the step of increasing the amount of the glass sintering aid, with very small or no additions of $Mn(NO_3)_2$ (#3D & #3F), also improves 125° insulation resistance as well as producing a more linear, less negative T.C.C. curve. It can be further seen that by adding 6.0 wt. % glass and increasing only the $SiO_2$ component of said glass, while also adding 0.05 wt. % $Mn(NO_3)_2$, the optimum compromise of electrical performance is achieved.

As shown by the results listed in Table IV, the low sintering temperature MLCC's prepared from sample #3G exhibit excellent electrical characteristics. Both the 1 KHz and 1 MHz percent dissipation factor have been reduced to ≦0.010%, the T.C.C. is well within the ±30 PPM/°C. E.I.A. specification for NPO dielectrics, the dielectric constant is 29 and the resistance value of the MLCC's at 25° C. are >10×10$^{12}$ ohms while the resistance X capacitance value at 125° C. is >100 MegΩ·μfd. It should also be noted that when this material was evaluated at a test frequency of 5 GHz the Q generated was >5000 with the accompanying Tf of 2.3 making this a micro-wave applicable ceramic.

While this invention has been described in detail in connection with only certain embodiments thereof it will be apparent to one skilled in the art that it is capable of still further modification, and that this application is intended to cover any such modification which may fall within the scope of one skilled in the art or the appended claims.

We claim:

1. A low firing temperature NPO ceramic dielectric composition in particle form consisting essentially of about 91.0 to about 94.0 wt. % of a calcined base mixture, about 6.0 to 7.5 wt. % of a low melting point glass frit mixture, 0.0 to about 1.5 wt. % of $SiO_2$, and 0.0 to about 0.25 wt. % of $Mn(NO_3)_2$, said calcined base mixture consisting essentially of about 44.86 to about 48.31 wt. % of $BaTiO_3$, from about 38.95 to about 43.02 wt. % of $TiO_2$, from about 5.69 to about 11.61 wt. % $ZrO_2$, and from about 1.42 to about 4.04 wt. % of $SiO_2$.

2. A low firing temperature NPO ceramic dielectric composition as defined in claim 1 having a dielectric constant in the range of between 25 and 40.

3. A low firing temperature NPO ceramic dielectric composition as defined in claim 1, wherein said low melting point glass frit mixture consists essentially of from about 46.10 to 56.55 wt. % of PbO, from about 16.26 to about 19.95 wt. % of $B_2O_3$, from about 7.32 to about 22.27 wt. % $SiO_2$, from about 4.08 to about 5.00 wt. % of $TiO_2$, from about 4.76 to about 5.84 wt. % LiF, from about 1.01 to about 1.24 wt. % $ZrO_2$, and from about 4.12 to about 5.53 wt. % of $Al_2O_3$.

4. A low firing temperature NPO ceramic dielectric composition as defined in claim 1, wherein said calcined base mixture is present in said composition in the amount of approximately 92.5 wt. %, said glass frit mixture is present in the amount of approximately 6.0 wt. %, said $SiO_2$, apart from the SiO2 in the calcined base mixture, is present in the amount of about 1.5 wt. %, and said Mn $(NO_3)_2$ is present in the amount of about 0.05 wt. %.

5. A multilayer ceramic capacitor comprising a fired ceramic substrate made from a ceramic dielectric composition consisting essentially of about 91.0 to about 94.0 wt. % of a calcined base mixture, about 6.0 to 7.5 wt. % of a low melting point glass frit mixture, 0.0 to about 1.5 wt. % of $SiO_2$, and 0.0 to about 0.25 wt. % of $Mn(NO_3)_2$, said calcined base mixture consisting essentially of about 44.86 to about 48.31 wt. % of $BaTiO_3$, from about 38.95 to about 43.02 wt. % of $TiO_2$, from about 5.69 to about 11.61 wt. % $ZrO_2$, and from about 1.42 to about 4.04 wt. % of $SiO_2$.

6. A multilayer ceramic capacitor as defined in claim 5 having a maximum change in capacitance over a temperature range of −55° C. to +125° C. of ±30 p.p.m./°C., and a dielectric constant between 25 and 40.

7. A multilayer ceramic capacitor as defined in claim 5 having at a test frequency of 1 KHz a dissipation factor in the range of about 0.009% to about 0.025%.

8. A multilayer ceramic capacitor as defined in claim 5 having at a test frequency of 1 MHz a dissipation factor in the range of about 0.008% to about 0.058%.

9. A multilayer ceramic capacitor as defined in claim 5 having at a test frequency of 5 GHz a Q in excess of 5000.

10. A multilayer ceramic capacitor as defined in claim 5 having an insulation resistance (IR) in excess of 100 MegΩ·μfd at 125° C., and a resistance value in excess of 10×10$^{12}$ ohms at 25° C.

* * * * *